J. S. SMITH.

Epaulet.

No. { 134, / 1,238. }

Reissued Nov. 26, 1861.

Witnesses:

Jas S Smith Jr

Wm Teusch

Inventor:

James S. Smith

N. PETERS, PHOTO-LITHOGRAPHER, WASHINGTON, D. C.

UNITED STATES PATENT OFFICE.

JAMES S. SMITH, OF NEW YORK, N. Y.

IMPROVEMENT IN EPAULETS.

Specification forming part of Letters Patent No. 23,620, dated April 12, 1859; Reissue No. 1,238, dated November 26, 1861.

*To all whom it may concern:*

Be it known that I, JAMES S. SMITH, of the city, county, and State of New York, have invented a new and useful Improvement in Epaulets; and I hereby declare that the following is a full, clear, and exact description of the same, reference being had to the accompanying drawings, making part of this specification, in which—

Figure 1:
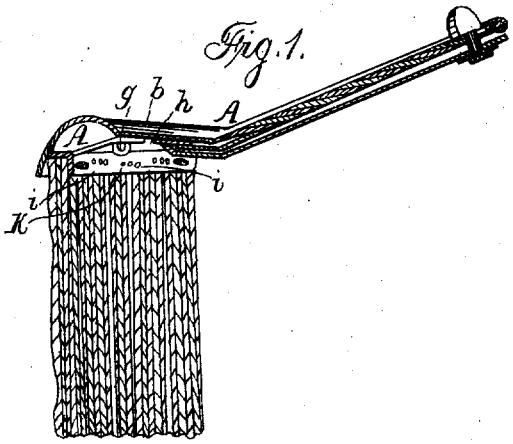
Figure 2:
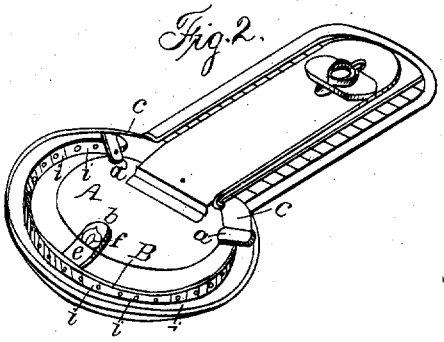
Figure 3:
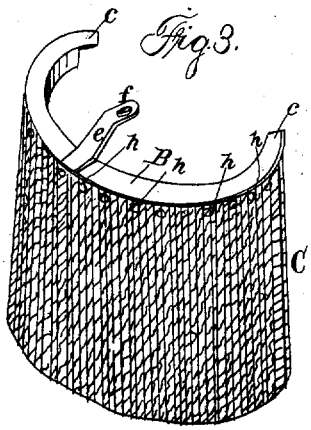

Figure 1 is a central section of an epaulet with my improvement, having the fringe attached; Fig. 2, a perspective view of the shell of the epaulet in an inverted position; Fig. 3, a perspective view of what I term the "adjuster," with its attached fringe detached from the shell.

Similar letters of reference denote like parts in all the figures.

Epaulets as ordinarily constructed consist of a shell, the margin of which is provided with holes for the attachment of the fringe or bullion to it. In such epaulets it is not contemplated, and indeed it is not practicable, to remove the fringe or bullion for the purpose of preserving it from being soiled when it is desirable to clean or polish the shell. The epaulet, on the other hand, being in great many cases a part of the soldier's equipment and designed to protect his shoulders against saber-cuts, while the fringe or bullion is merely an ornament or mark of distinction or of rank, it is important that the fringe or bullion should be made readily detachable from and adjustable to the shell or epaulet proper.

My invention therefore has for its object the construction, arrangement, and combination of the parts constituting an epaulet in such a manner that the shell or epaulet proper and the fringe may be readily united or disconnected at pleasure; and it consists in the construction of an epaulet, the same consisting of the combination of three elements, viz: first, of a shell or the epaulet proper with its usual means of attachment to the coat; second, of a bullion or fringe permanently attached or secured to a frame or plate or what I term the "adjuster;" and, third, of a mechanical device for holding the said frame or plate or adjuster within the shell, substantially in the manner as hereinafter described.

To enable others skilled in the art to make and use my invention, I will proceed to describe it with reference to the drawings.

In carrying out my invention the shell A of the epaulet is constructed in the same manner as when intended to be worn without fringe, or as sometimes constructed when worn with fringe, except that no holes are provided in the margin for sewing on the fringe, as has heretofore been customary. To the under part of the shell thus constructed I attach permanently, by soldering or otherwise, two small metallic straps, *a a*, and a small staple or eye, *b*, in about the position shown in Fig. 2, the former being attached at each of their extremities, so as to leave room between them and the shell to receive the ends of what I term the "adjuster" B. This adjuster consists of a strip of metal of rectangular form in its transverse section, and of a form longitudinally to conform to and be received within and covered by the outer margin of the shell, as shown in Fig. 2, where it is represented in its place in red outline. The extremities of the said adjuster are formed as shown at *c*, Figs. 2 and 3, to pass between the strap *a a* and the shell, and said adjuster has permanently attached at its middle a piece of metal plate, *e*, so formed with a slot, *f*, that when said adjuster is placed close within the margin of the shell with the ends *c c* within the straps *a a*, the slot *f* will fit over the staple or eye *b*, as shown in Figs. 1 and 2, and permit the adjuster to be secured in the shell by passing a small thong or key, *g*, of leather or other suitable material, tightly through the projecting portion of said staple or eye.

The fringe or bullion C is permanently attached to the adjuster B by sewing with a thread, *h*, passing through holes *i i*, provided in the adjuster to receive it, and is permitted to be taken out by simply drawing out the thong or key *g*, drawing the middle portion of the adjuster away from the shell, and slipping out the ends *c c* from under the straps *a a*. The fringe or bullion is replaced again by first slipping the ends of the adjuster into the straps *a a*, then bringing the slot *f* over the staple *b* and replacing the thong or key *g*, the adjuster being then concealed when the epaulet is in wear, and the epaulet presenting a neater appearance than the ordinary fringed or bullion epaulet.

Having thus described my invention and the manner in which the same is or may be carried into effect, I would here observe that

I do not confine myself to the precise construction, arrangement, and combination of parts as hereinabove described, it being obvious that my improvement is susceptible of many modifications without departing from the principle of my invention.

What I claim as my invention, and desire to secure by Letters Patent, is—

The construction, arrangement, and combination of epaulets substantially as hereinbefore described, the same consisting of the following three elements combined: first, a shell or epaulet proper, with its usual appliance or appliances for its attachment to the coat; second, a bullion or fringe permanently attached or secured to a frame, plate, or what is hereinbefore termed an "adjuster;" and, third, a mechanical device for holding the said frame, plate, or adjuster within the shell, substantially in the manner and for the purposes herein set forth.

In testimony whereof I have signed my name to this specification before two subscribing witnesses.

JAMES S. SMITH.

Witnesses:

A. POLLAK,

EDM. F. BROWN.